US005704439A

United States Patent [19]

Kitahama et al.

[11] Patent Number: 5,704,439

[45] Date of Patent: Jan. 6, 1998

[54] ELECTRIC WHEELCHAIR AND SEAT MOUNT-DISMOUNT APPARATUS THEREFOR

[76] Inventors: Kiyoshi Kitahama; Tsuruko Kitahama, both of 1639, Aonohara, Tsukui-machi, Tsukui-machi, Tsukui-gun, Kanagawa Prefecture, Japan

[21] Appl. No.: 363,014

[22] Filed: Dec. 23, 1994

[30] Foreign Application Priority Data

Dec. 24, 1993 [JP] Japan .................................... 5-354893

[51] Int. Cl.[6] .................................................... B60K 1/02

[52] U.S. Cl. .......................... 180/65.1; 180/907; 180/6.5

[58] Field of Search ................................ 180/65.1, 65.2, 180/907, 6.5; 280/304.1, 250.1; 414/921; 297/DIG. 4, DIG. 10

[56] References Cited

U.S. PATENT DOCUMENTS

| | | | |
|---|---|---|---|
| 4,050,533 | 9/1977 | Seamone | 180/907 |
| 4,067,409 | 1/1978 | DiMatteo et al. | 180/907 |
| 5,096,008 | 3/1992 | Mankowski | 180/907 |
| 5,112,076 | 5/1992 | Wilson | 180/907 |
| 5,255,934 | 10/1993 | Wilson | 180/907 |
| 5,409,074 | 4/1995 | Wilson et al. | 180/907 |

FOREIGN PATENT DOCUMENTS

| | | |
|---|---|---|
| 51-23055 | 4/1975 | Japan . |
| 367697 | 3/1991 | Japan . |
| 344183 | 9/1991 | Japan . |
| 366898 | 10/1991 | Japan . |
| 396822 | 10/1991 | Japan . |
| 455704 | 9/1992 | Japan . |

*Primary Examiner*—Richard M. Camby
*Attorney, Agent, or Firm*—Birch, Stewart, Kolasch & Birch, LLP

[57] ABSTRACT

An electric wheelchair includes a pair of car body support posts, each having an elbow support post, a front support post and a bottom support post. The car body support posts are formed in a U-shape with the open part directed backward, and with the elbow support post and the bottom support post arranged in parallel with one another. A bottom plate firmly connects the car body support posts side-by-side. At least one back support post is provided which can be connected to the elbow support posts at the free end thereof and can be removed therefrom. A detachable seat is supported by the car body support posts. An electric driving unit includes at least one outer box, a battery, two motors and a control box, and is provided at a front portion of the bottom support posts. A pair of electric drive front wheels are provided, each directly connected to the motors, one to the right motor and the other to the left motor, and a pair of rear wheels support the rear of the wheelchair.

13 Claims, 6 Drawing Sheets

FIG. 1B
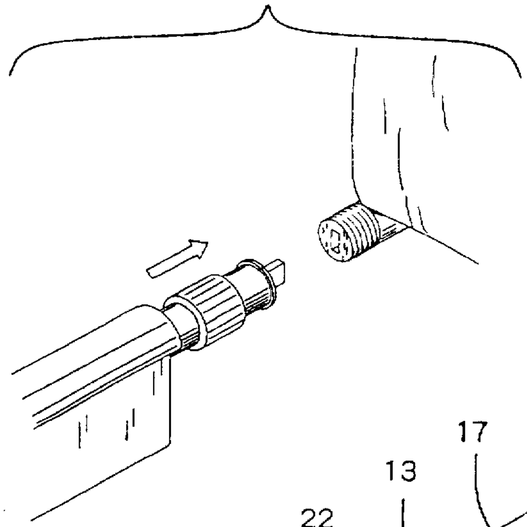
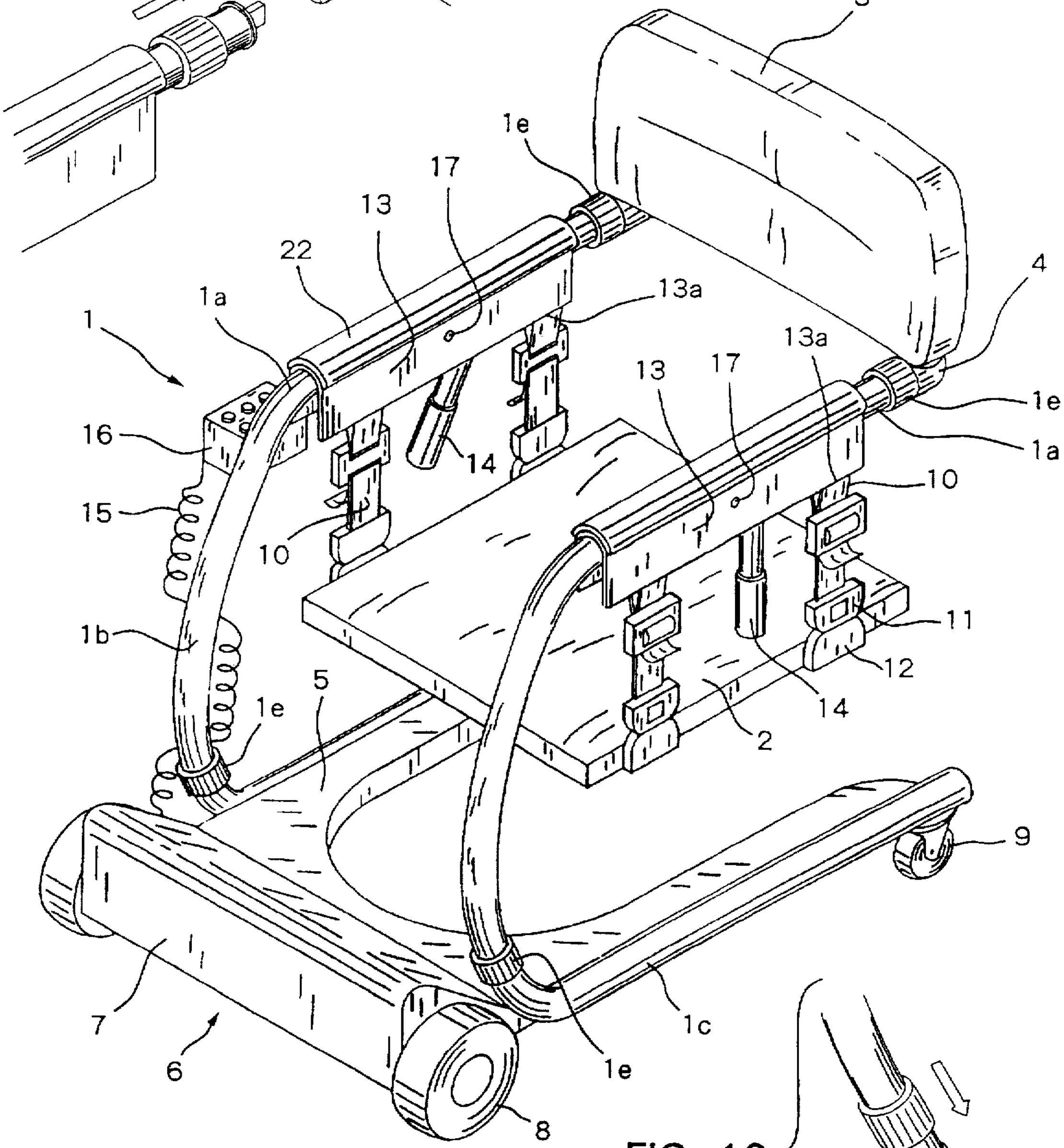
FIG. 1A
FIG. 1C
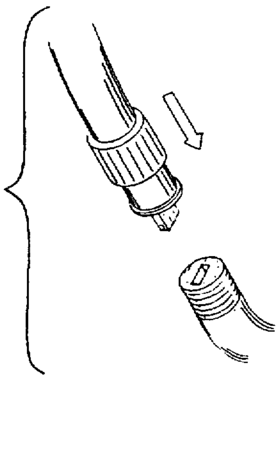

FIG. 2B
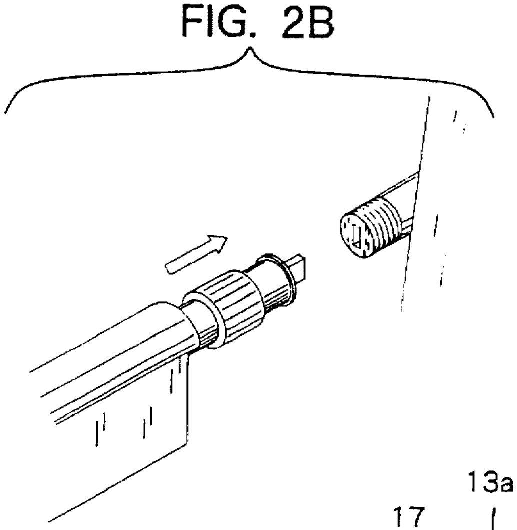
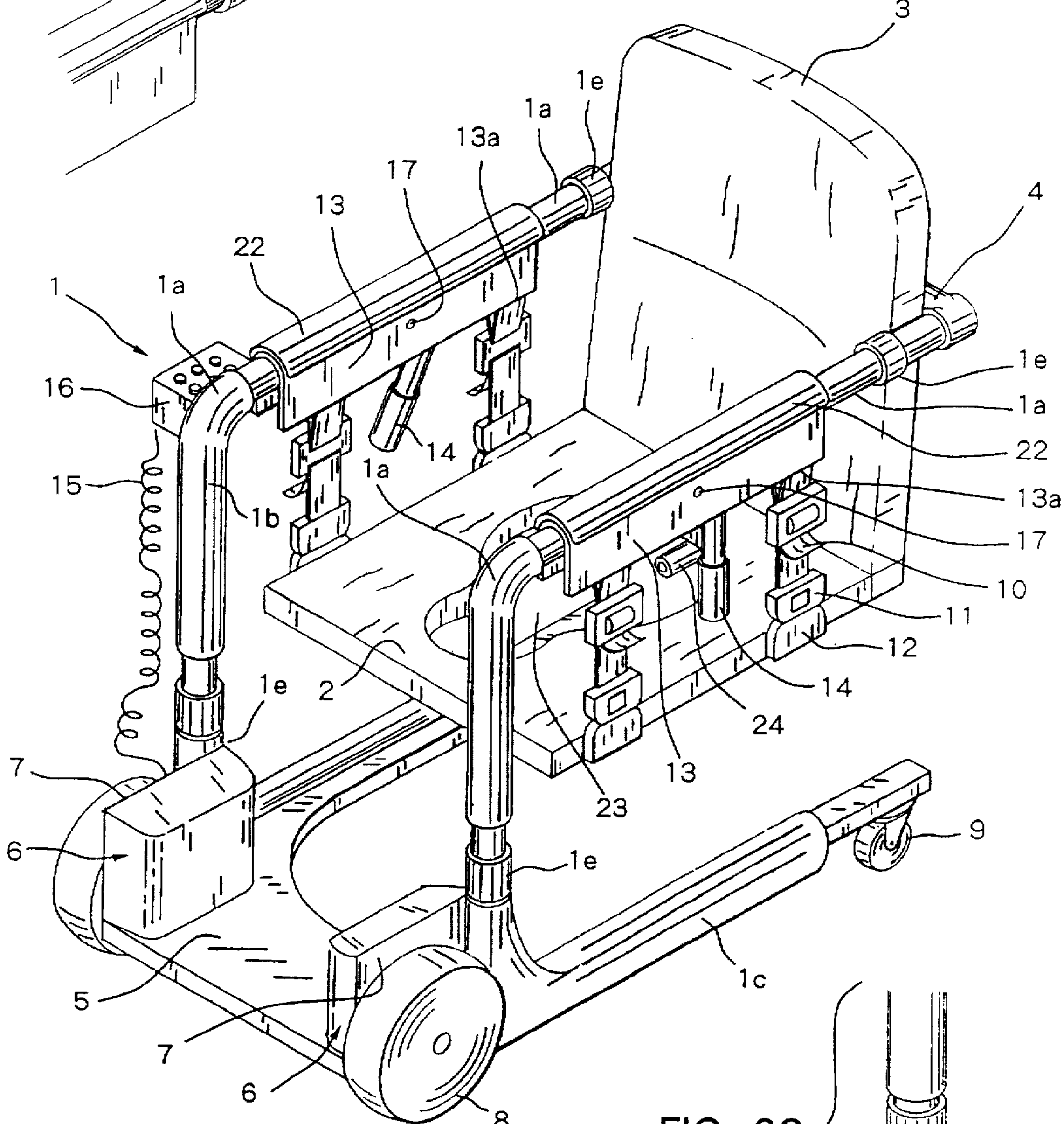
FIG. 2A
FIG. 2C
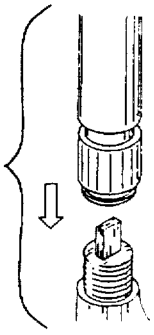

ELECTRIC WHEELCHAIR AND SEAT MOUNT-DISMOUNT APPARATUS THEREFOR

BACKGROUND OF THE INVENTION

1. Field of the Invention

The present invention relates to an electric wheelchair used by handicapped persons who have difficulty in walking, sick persons, and aged persons, more specifically to an electric wheelchair with transfer—and toilet-use facilities in itself, and also to a seat mount-dismount apparatus for a wheelchair.

2. Discussion of Background

A wheelchair is an effective appliance by which a person who has difficulty in walking can live an independent life in society.

The conventional wheelchair, however, has difficult problems of using a toilet, and transferring between a bed, sofa, shower stand in a bath room or automobile seat and the wheelchair when used in a daily life by a user. This fact is considered as a large obstacle to the user's independent life. When a person who lives with a wheelchair performs the above-mentioned transferring or uses a toilet, he moves by himself supported by his arms, or requires to be assisted in the arms of a helper. The person on a wheelchair is often involved in such a danger as falling down from the wheelchair in the case of moving by himself, and on the other hand, the helper often hurts his waist, in the case of assisting the user of a wheelchair, since the helper holds a heavy body of the handicapped person in a half-sitting posture. It is considered that this problem is difficult to be solved, which is physically and mentally a severe burden not only to the wheelchair user but also to the helper.

There has been provided the arts as follows which eliminate the difficulties of transferring and using a toilet as mentioned above for using the wheelchair.

a. One of the examples of the above-mentioned arts is on-the-floor running type lift apparatus. This lift apparatus is composed of a firm supporting arm with a casters, provided with a human body strap in the form of a sheet suspended from the supporting arm, by which a human body is held and transferred with the mount-dismount movement of the apparatus. This is the most frequently employed apparatus in welfare advanced nations such as European countries and the United State.

b. Another example of the arts is ceiling-mounted running type lift apparatus. In the case of this apparatus, rails are provided on the ceiling wall, and a human body strap in the form of a sheet suspended from a motor hung on the rails. A human body is held by the strap and transferred with the mount-dismount movement of the apparatus.

c. Furthermore, a wheelchair composed of a nursing vehicle and wheels having hand rims is known, of which purpose is limited for toilet- and shower-use. This type of wheelchair has a seat with a hole for evacuation, and used with a toilet stool positioned under the seat or by the seat placed on the toilet stool with the wheelchair moved backward.

d. An electric wheelchair provided with an electric drive unit under the seat is widely employed the world over as to electric wheelchairs.

e. An electrically movable lift apparatus is commercially available as Love Lift System. It is considered that this apparatus is substantially a lift which has a tendency to be employed as a wheelchair and whose object is for making the transferring operation of the lift user.

In the above described apparatus, there are the shortcomings as follows;

a. The on-the-floor running type lift apparatus, which is human body size and runs by means of 3 to 4 casters, is not suitable for use in Japanese houses which are generally narrow and made by use of straw matting and wood, having difference in level.

b. In the case of the ceiling-mounted running type lift apparatus, it is necessary to provide a rail installation equipment on the ceiling for moving the apparatus. Accordingly, there are shortcomings with respect to the weight of the apparatus and space therefor in Japanese wooden houses. In addition, the equipment is large and costs much. Moreover, both the lift apparatus (a) and (b) have such problems that the users thereof feel uneasiness while in use and the helpers have to practice in holding the user's body by using the suspending sheet.

c. The nursing vehicle or the wheelchair of the previously mentioned c are designed as exclusive products with a sole object of using a toilet and shower taken into consideration, each of which has no transfer means for getting on and off the vehicle. In addition to the above, the wheelchair is not suitable for use in a daily life, since the wheelchair has not been produced for the objects of living in comfort and making a move. The fact is that the frequency in use thereof tends to be reduced day by day even though the user has bought it expressly.

d. This type of electric wheelchair, as well as the above, is not produced with the objects of making the transferring and using a toilet easy.

e. The aforementioned electrically movable lift apparatus comprises drive means provided at a leg portion under a seat for raising and lowering the seat thereof, that is, for extending and shortening a pair of big and stiff leg support posts of the lift apparatus. This lift apparatus is manufactured with the object of transfer taken into consideration. However, the bottom portion of the apparatus is considerably large, so that it is impossible to smoothly perform the transfer between the lift apparatus and a bed especially with a low height or a car seat with the bottom support inserted under the bed or the car, when practically employed in a daily life.

In recent years, the seat folding type metallic wheelchair, which was developed in 1933 by Americans, Mr. Everest and Mr. Jennings, has been employed for 60 years. This wheelchair is highly evaluated internationally. However, there is the fact that the transferring and using a toilet, which are important to the users, are difficult for the users of the wheelchair. A conventional electric wheelchair which can be moved by self operation also has the same sort of problems. More precisely, when the electric driving unit is provided under the seat as can be seen in conventional electric wheelchairs, it becomes difficult to perform the transfer of the wheelchair user since the car body of the wheelchair cannot be moved backwards because of the driving unit as an obstacle.

The inventors of the present invention propose an idea for a wheelchair, "A wheelchair should have functions to make the transferring and using a toilet easy.", which can never be seen in the above described conventional apparatus for which the helper's assistance is inevitable. In contrast, the present invention proposes an electric wheelchair which does not require the assistance of a helper.

SUMMARY OF THE INVENTION

It is therefore first object of the present invention to provide an electric wheelchair which a user can easily get on and off and can be moved by his self operation.

A second object of the present invention is to provide a seat mount-dismount apparatus for a wheelchair by which the transfer operation can smoothly be carried out.

The first object of the present invention can be attained by an electric wheelchair comprising; a pair of car body support posts, each comprising an elbow support post, a front support post and a bottom support post, the car body support posts being in almost U shape with the open part directed backward and arranged in parallel with one another; a bottom plate for firmly connecting the car body support posts side by side; at least one back support post which can be connected to the elbow support posts at the free end thereof and can be removed therefrom; a detachable seat; an electric driving unit comprising at least one outer box, a battery, two motors and a control box, provided at a front position of the bottom support posts; a pair of electric drive front wheels, each directly connected to the motors, one to the right motor and the other to the left motor; and a pair of rear wheels.

The first object of the present invention can also be attained by an electric wheelchair comprising; a pair of car body support posts, each comprising an elbow support post, a front support post and a bottom support post, the car body support posts being in almost U shape with the open part directed backward and arranged in parallel with one another; a bottom plate for firmly connecting the car body support posts side by side; a back support post which can be connected to the elbow support posts at the free end thereof and can be removed therefrom; a detachable seat; an electric driving unit comprising at least one outer box, a battery, two motors and a control box, provided at a front portion of said bottom support posts; a pair of electric drive front wheels, each directly connected to the motors, one to the right motor and the other to the left motor; a pair of rear wheels; and a seat mount-dismount apparatus comprising a pair of rotation members, each attached to the elbow support post, one to the right elbow support post and the other to the left elbow support post and rotated therearound, and handles for rotary moving the rotation members.

The second object of the present invention can be attained by a seat mount-dismount apparatus for a wheelchair comprising; a pair of rotation members, to be attached to elbow support posts of a wheelchair, one to the right elbow support post and another to the left elbow support post and rotated therearound; and handles for rotary moving the rotation members.

The second object of the present invention can also be attained by a seat mount-dismount apparatus for a wheelchair comprising; a pair of ring-shaped running members; a pair of rotation members provided to cover the running members, to be attached to elbow support posts or seat support posts of a wheelchair, one to the right support post and the other to the left support post and rotated therearound; and handles for rotary moving said rotation members.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a perspective view of an embodiment of an electric wheelchair according to the present invention;

FIGS. 1B and 1C are enlarged views of the connector shown in FIG. 1A;

FIG. 2A is a perspective view of another embodiment of an electric wheelchair according to the present invention;

FIGS. 2B and 2C are enlarged views of the connector shown in FIG. 2A;

DETAILED DESCRIPTION OF THE PREFERRED EMBODIMENTS

The wheelchair according to the present invention comprises a pair of car body support posts, each comprising an elbow support post, a front support post and a bottom support post, the car body support posts being in almost U shape with the open part directed backward and arranged in parallel with one another; a bottom plate for firmly connecting the car body support posts side by side; at least one back support post which can be connected to the elbow support posts at the free end thereof and can be removed therefrom; a detachable seat; an electric driving unit comprising at least one outer box, a battery, two motors and a control box, provided at a front portion of the bottom support posts; a pair of electric drive front wheels, each directly connected to the motors, one to the right motor and the other to the left motor; and a pair of rear wheels.

Figure 6:
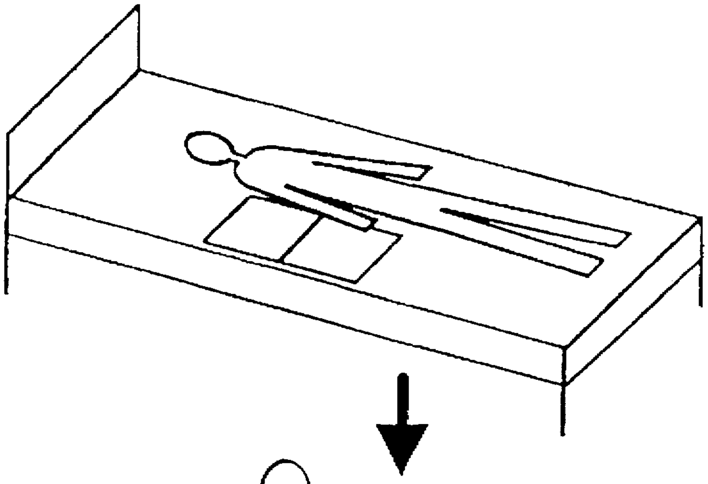
Figure 6:
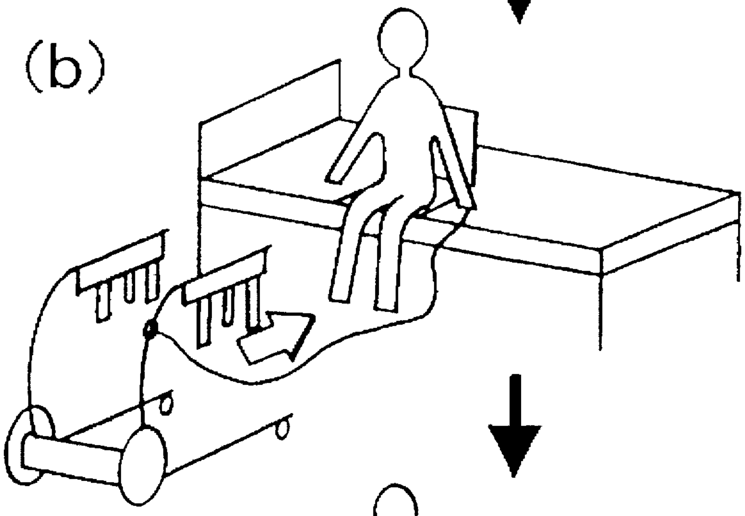
Figure 6:
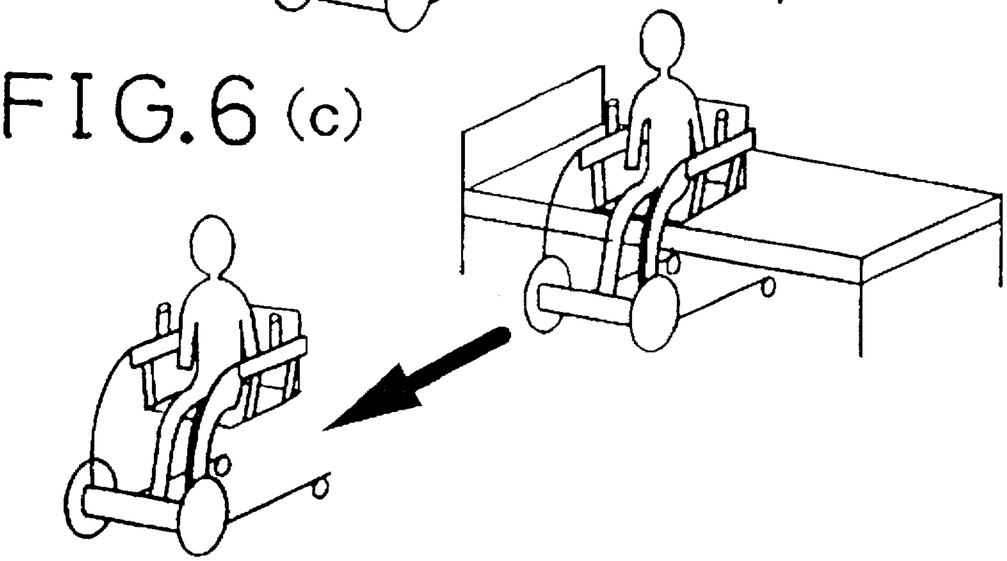

The function of the wheelchair of the present invention will now be explained with reference to FIGS. 6(*a*) to 6(*c*), which are diagrams for explaining the process of using the wheelchair.

1. The seat (including a seat with a back-rest, and a seat for evacuation) is detached from the wheelchair and placed on the edge of a bed (FIG. 6(*a*)).

2. The user sits on the seat (FIG. 6(*b*)).

3. The back-rest portion of the wheelchair is opened (FIG. 6(*b*)). The back-rest portion is removable or in the form of a double-leafed hinged door or a single swing door.

4. The car body is led to move backward in the direction of the arrow shown in FIG. 6(*b*), and the bottom portion of the car body is inserted under the bed simultaneously with the elbow support posts moved to be placed above the bed as can be seen in FIG. 6(*c*).

5. The seat is attached to the suspending belt of the wheelchair, and the back-rest portion is closed.

6. The seat is raised so as to be 4 to 5 cm above the bed by rotating handles provided at each elbow support post first to the outer side of the wheelchair and then upward. This mount-dismount technique is peculiar to the present invention.

7. Thereafter, the wheelchair is led to move forward in the direction of the arrow in FIG. 6(*c*).

Thus, the transfer from the bed to the wheelchair is completed. The transfer from the wheelchair to the bed can be performed with the above mentioned operation carried out in the reversed order. In the same way, the transfer between the wheelchair and a stand, sofa, or automobile seat can easily be performed.

In addition to the above, in the case of using a toilet, the seat of the wheelchair is exchanged by a seat for evacuation in advance, the wheelchair is led to move backward, and the seat is put on the toilet stool. The seat of the wheelchair is smoothly detachable and can be exchanged easily.

FIGS. 1 and 2 show perspective views of electric wheelchairs of the present invention. Each of the wheelchair comprises a pair of car body support posts 1, mainly composed of three portions of an elbow support post 1*a*, a front support post 1*b* and a bottom support post 1*c*, arranged in parallel with one another. The lower portion of a seat 2 and a back-rest portion 3, supported by at least one back support post can form vacant spaces which is open in the backward direction of the electric wheelchair.

In the case of FIG. 1, a pair of back support posts are vertically raised upward from the free ends of the elbow support posts 1*a* for supporting the back-rest portion 3. Alternatively, in the wheelchair of FIG. 2, a single back support post 4 is horizontally provided combining the free ends of the elbow support post 1*a*.

The seat 2 is suspended by means of belts 10 attached to elbow support posts 1*b*, and each of the belt is fitted to the seat by use of a connecting part 11 of the belt side and a connecting part 12 of the seat side.

The car body support posts 1 arranged in parallel are firmly fixed by a bottom support plate 5 connected side by side. Each side of the bottom plate 5 is fixed to the bottom support post 1*c* and may be detached therefrom. In other case, the bottom plate 5 and the bottom support posts 1*c* can be manufactured as one united body.

An electric driving unit 6, comprising an outer box 7 containing a battery 32, two motors 30, control box 34 and the like therein, is provided in front of the bottom support posts 1*c* or on the bottom plate 5. In the case where the electric driving unit 6 is divided into two portions by means of two outer boxes 7, each outer box comprises a motor and the outer boxes 7 are respectively provided at the front portion of the bottom support posts 1*c*.

A pair of electric drive front wheels 8, provided at front bottom portion of the wheelchair are directly connected to two motors 30, one is to a left motor and another is to a right motor, and a pair of rear wheels 9 are provided at rear and lower parts of the bottom support posts 1*c*. Each of the outer boxes 7 of the electric drive unit 6, and the bottom plate 5 can be used as footstools.

An Electric conduction wire 15 led from the electric drive unit 6 is introduced to an inner portion of the front support post 1*b* by way of the back side of the footstools, which wire is connected as expandable electric conduction wires to a controller 16. It is also possible that the electric wheelchair is controlled by use of the wireless system.

The seat 2 is readily fitted to and detached from the car body of the wheelchair with insertion operation of the belts, and is exchangeable into other seats such as a comfortable seat generally employed in a house, a seat with a back-rest, or a seat for a toilet stool. It is also possible to provide a horizontal rotation plate or a sheet formed rotation member on the back side of the seat.

The support posts of the wheelchair, for instance, is made of a stainless steel pipe with a diameter of about 25 to 30 mm and a wall thickness of about 2 mm. The wheelchair has an entire depth of about 80 to 100 cm, a width of about 50 to 60 cm, and a height of about 70 to 90 cm.

The support post 1 of the wheelchair may be in a tube form, rectangular form, plate form or the combination form of these. It is possible that each of the car body support posts 1 is composed of two parts, with the front support post 1*b* which can be attached to and detached from the bottom support post 1*c* by means of an attachment member 1*e*. Conventionally, it has been difficult to completely eliminate vertical and horizontal trembling of the support posts of the wheelchair. The attachment member 1*e*, as shown in FIGS. 1 and 2 at the circled part (B), is composed of a metal fitting in the square shape provided at one end of the detached support post and a hole on the other end of the support post into which the metal fitting is stuffed and fitted. The firmly connected support posts by means of the attachment member 1*e* is provided on the firm bottom plate as a base support in the present invention. The attachment member 1*e* to make the elbow support post and the back support post detachable, as shown in the circled part (A) is also provided in the same way. The car body support post 1 for use in the present invention can be firmly and stably constructed even when the back support post is horizontally provided connecting the free ends of the elbow support posts.

Accordingly, the wheelchair of the present invention can be easily disassembled and contained in a car trunk for transportation.

In FIG. 2, a reference numeral 23 indicates a hole for evacuation, and 24, a water-discharge pipe provided at the hole 23 for evacuation. A water pipe is connected to this water-discharge pipe 24 for washing the seat after evacuation. This type of seat is effectively utilized by an upper half of the body-, hand-, or finger-handicapped person.

The car body structure of the electric wheelchair according to the present invention is very simple basically composed of a firm, almost U-shaped bottom plate which is open toward the rear side of the wheelchair and parallely arranged to support pipes placed thereon, as described previously. The wheelchair with such shape can easily be manufactured with a low cost, and the maintenance and treatment thereof are easy.

Moreover, the metallic portion of the support post can be covered with a material such as a synthetic rubber or leather for protecting the post from being cold or for coloring the same.

The wheelchair according to the present invention has a simpler construction of the car body in comparison with the conventional wheelchairs. This simple construction of the car body has been finally attained by the seat mount-dismount apparatus of the present invention.

In contrast to this, a conventional wheelchair cannot have such a simple construction as that described in the wheelchair of the present invention, with the conventional seat mount-dismount apparatus, which requires strong and solid support posts using worm gear rotation method or oil pressure process. This is because the conventional seat mount-dismount apparatus is structurally complicated and the weight thereof is increased.

A first seat mounts-dismount apparatus for a wheelchair of the present invention comprises a pair of rotation members, to be attached to elbow support posts of a wheelchair, one to the right elbow support post and another to the left elbow support post and rotated therearound; and handles for rotary moving the rotation members.

Alternatively, a second seat mount-dismount apparatus for a wheelchair of the present invention comprises a pair of ring-shaped running members; a pair of rotation members provided to cover the running members, to be attached to elbow support posts or seat support posts of a wheelchair, one to the right support post and the other to the left support post and rotated therearound; and handles for rotary moving the rotation members.

Figure 3:
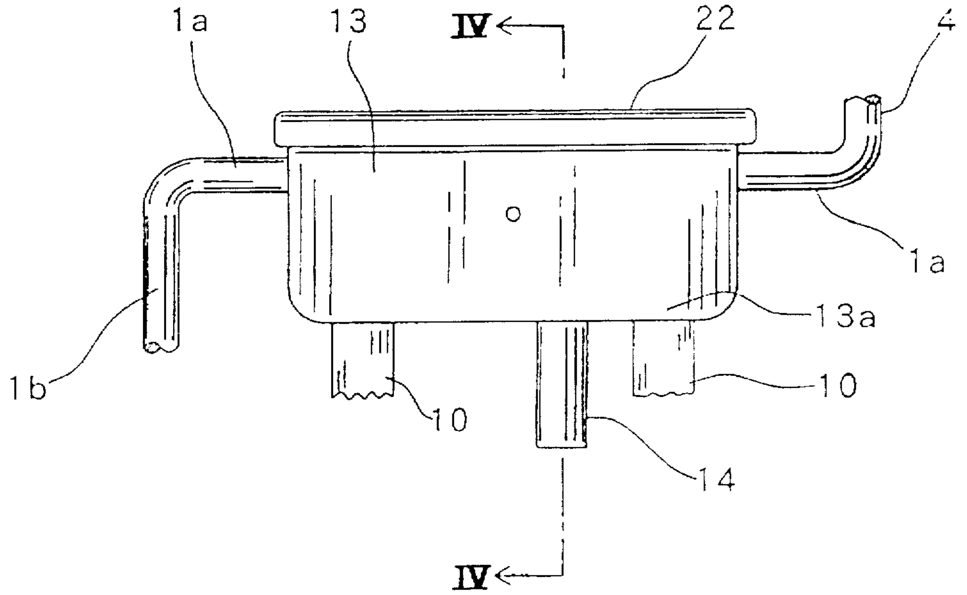
FIG. 3 is a side view of an embodiment of a seat mount-dismount apparatus according to the present invention.
Figure 7:
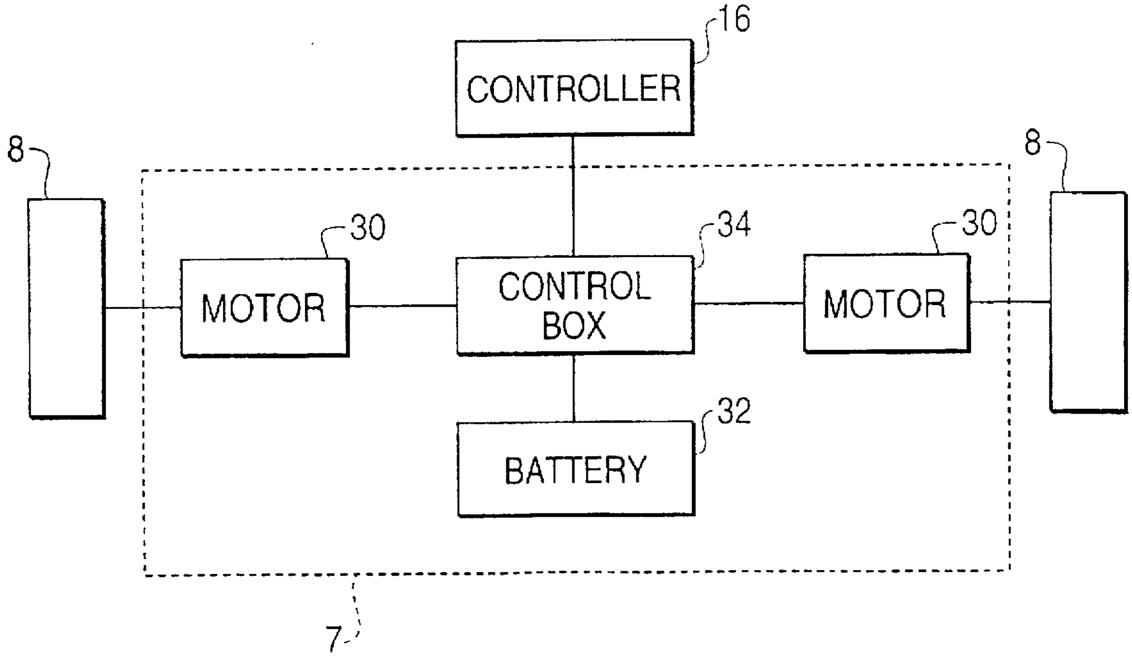
FIGS. 6(*a*) to 6(*c*) are diagrams for explaining the using process of an electric wheelchair according to the present invention and FIG. 7 is a block diagram of a driving unit according to the present invention.

The above described first seat mount-dismount apparatus of the present invention will now be explained with referring to the embodiments shown in FIGS. 3 and 4. FIG. 3 is a side view of an embodiment of a seat mount-dismount apparatus according to the present invention, and FIG. 4 is an expanded sectional view of the seat mount-dismount apparatus in FIG. 3 cut by the broken line pq and seen in the direction of the arrow shown in FIG. 3.

The elbow support posts 1*a* suspend the seat 2 by means of belts 10, and a rotation member 13 or a cover for the elbow support post 1*a*, which is made of a rigid plate with a deep groove shape, is deeply fitted to each of the elbow support posts 1*a*. An arm-rest 22 is provided on the top surface of each cover 13. A reference numeral 1*b* is a front support post, and a reference numeral 4, a back support post. Inside the cover 13, a handle 14 is provided on each of the elbow support post in the downward direction at almost the center with respect to the longitudinal direction thereof. The handle 14 is in the form of a tube, the upper side 14*a* thereof come into contact with the elbow support post 1*a* via a running member 21, being fixed to the cover 13 by a joint shaft 17. A lock rod 18 is held by a spring 19 in the handle 14.

Figure 4:
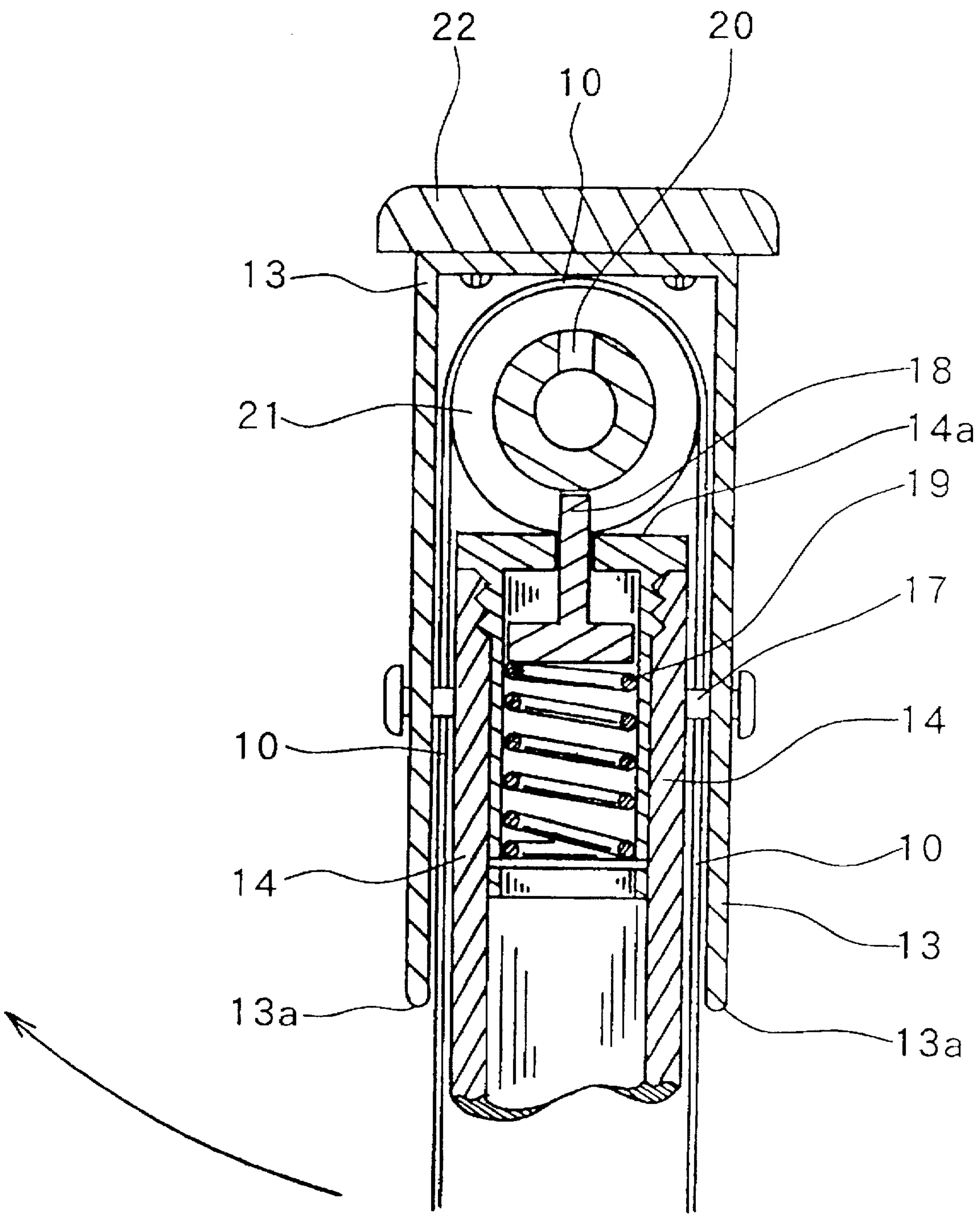
FIG. 4 is an expanded sectional view of the seat mount-dismount apparatus in FIG. 3 cut by the broken line IV—IV and seen in the direction of the arrow shown in FIG. 3.

When the handles 14 are turned round towards the upper direction of the car body by way of the outer side thereof in the direction of the arrow shown in FIG. 4, the belts 10 are pushed up by being folded back at a lower side 13*a* of the cover 13, whereby the belts 10 are raised up by about 2 times the depth of the cover (3 to 6 cm) and the seat comes up from the stand surface on which a person sits. There can be formed a large space between the seat and the stand, so that the seat with a load of a body can easily be taken in and out from a sofa or a bed even with strong springs. The handles 14 are fixed, each with the lock rod 18 contained therein pressed by the spring 19 and locked into a lock hole 20 in an oval shape of the elbow support post 21 with the handles raised up at a right angle with respect to the elbow support post simultaneously when the seat is raised up. The lock can be released by turning the handle 14 down in the front or back direction of the wheelchair in parallel with the elbow support post. More specifically, the oval shaped lock hole 20 is provided on the elbow support post 1*b* with the application of a thin plate with a thickness of about 7 mm thereon in such a fashion that the longer diameter of the oval hole corresponds to the longitudinal direction of the elbow support post and the thin plate is placed over the hole with the longer side placed across the longer diameter. Accordingly, the lock rod slides on the plate in the longitudinal direction thereof as the handle is turned down, whereby the lock is released.

It is suitable to adjust the handle 14 at the portion corresponding to the center of the gravity of a user's body. A body with a weight of 80 Kg can easily be raised up by a standard female force with the handles having a length of about 10 to 20 cm. This effect of the seat mount-dismount apparatus is based on "revolution principle" for use in the present invention. It is also possible to further save force with extendable grips of handles 14 employed. The handles 14 can be contained in the covers when brought down in the horizontal direction.

The above described seat mount-dismount apparatus can also employed as a component of the electric wheelchair of the present invention as shown in FIG. 1 and 2.

Figure 5:
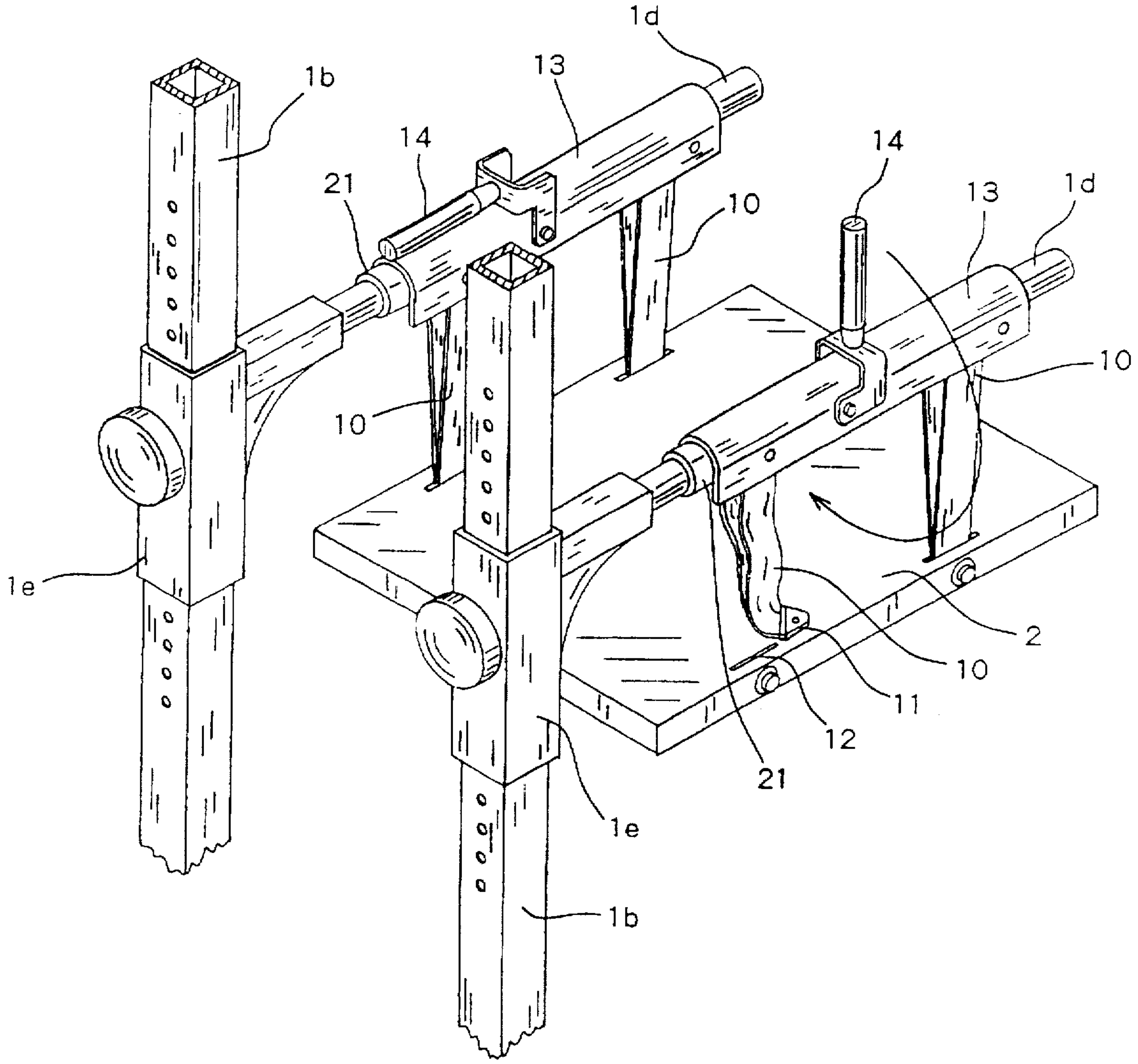
FIG. 5 is a perspective view of another embodiment of a seat mount-dismount apparatus to be fit to seat support posts of a wheelchair.

FIG. 5 shows a partial perspective view of an embodiment of the second seat mount-dismount apparatus according to the present invention to be attached to a seat support posts 1*d* of a wheelchair, each with a ring-shaped running member 21 provided therearound. It is possible that the electric wheelchair of the present invention further comprises the seat support posts almost at the center between the elbow support posts and the bottom support posts in parallel therewith. In this case, the U-shaped car body support post are made into E shaped posts. The seat mount-dismount apparatus in FIG. 5 can be set to the elbow support post as shown in FIG. 1 and 2, or in the other case, can be set to the seat support posts. In the case where the seat mount-dismount apparatus is attached to the seat support posts, the transfer operation of the wheelchair use can easily be performed without a helper. The seat support post 1*d* slides along a front support post 1*b* by means of a slide support member 1*e*. A seat 2 is suspended by means of the belts 10, with a connecting part 11 of the belt side and a connecting part 12 of the seat side being connected. In FIG. 5, handles 14 are attached to rotation members 13 as covers of the seat support posts 1*d* directing to the upper side, and the lengths of the belts 10 are set to be short. In such case, the seat mount-dismount operation can be carried out in the same manner as previously described.

The belts 10, of which embodiment was already described, can be prepared in a variety of forms by employing cloth, leather, synthetic resin, or metallic material. The belts 10 can be connected to the seat by use of other process than that mentioned previously. Furthermore, it is possible to provide a smoothing rotation member on the back side of the seat in order to easily change the direction of a body position to the left side or right side.

The electric wheelchair according to the present invention has been developed based upon a novel idea for a wheelchair with facilities of the transferring and the toilet use which can be controlled by the user himself.

As one of the effects of the wheelchair of the present invention, the transfer operation can be performed in such a manner that the wheelchair is moved backward, mainly with a self electric operation to insert the support posts of the wheelchair under a stand, and then the user's body together with the seat is moved onto the wheelchair, as explained previously with referring to FIG. 6. In this case, the bottom support posts form a single body which does not have supplemental matters except wheels or casters, so that the support posts can be deeply inserted even to a narrow space under the stand.

The toilet use can be carried out by leading the car body backward to the toilet stool and putting the seat of the wheelchair on a toilet stool by the self electric operation.

The seat mount-dismount apparatus of the present invention was accomplished by use of a technique made with the application of the "revolution principle" and the "principle of the lever" of an object. By the extremely simple mechanism of the seat mount-dismount apparatus of the present invention, the seat of a wheelchair with a user placed thereon can easily be taken on and off, whereby the object of transferring can be easily attained. In addition to the above, the seat exchange can performed smoothly by use of the seat mount-dismount apparatus of the present invention, and a folding legless chair with a back-rest which gives a high comfortableness to a user, a seat for a toilet with a washing apparatus or the like can be employed.

Furthermore, the electric wheelchair of the present invention can be guided and moved in accordance with a remote control process under the application of the wire system or wireless system. The present invention proposes using the wheelchair to which a pair of wheels each having a hand rim can be attached, and the seat mount-dismount apparatus, for making the transferring and the use of a toilet easy by moving the car body with the user thereon backward by his self operation, inserting the bottom support posts under a stand to which the user transfers simultaneously with the detachable seat portion moved onto the stand, and then transferring the user's body to the stand together with the seat of the wheelchair. The wheelchair can be moved backward and the bottom plate can be inserted to a narrow space by the remote control operation since the bottom plate of the wheelchair is provided at a relatively low position with respect to a floor or the ground and the rear wheels are small. This transfer operation can be carried out by user's self operation without any helper's assistance, so that the electric wheelchair is effectively employed not only in a house but also on a train, airplane, in school, work-place or public institutions. This transfer operation can never be attained by a conventional electric wheelchair which has an electric driving unit under the seat thereof, as mentioned previously.

Furthermore, it is also possible to use a toilet in the sitting state on the seat of the wheelchair, with the car body moved backward and a seat for evacuation put on the toilet stool especially when a wheelchair user uses a general type toilet designed for a person with a vigorous body. This type of electric wheelchair has never been previously invented or manufactured.

Thus, the electric wheelchair of the present invention and the seat mount-dismount apparatus therefor have drastic effects for handicapped persons as wheelchair users, supporting their participation in social activities, as well as their independent life at home.

What is claimed is:

1. An electric wheelchair comprising:

a pair of car body support posts, each car body support post comprising an elbow support post, a front support post and a bottom support post, said car body support posts being formed substantially in a U-shape with an open part of said U-shape directed backward, and with said elbow support post and said bottom support post arranged in parallel with one another;

a bottom plate for firmly connecting said car body support posts side-by-side;

at least one back support post which can be connected to said elbow support posts at the free end thereof and can be removed therefrom;

a detachable seat removably supported by said car body support posts;

an electric driving unit comprising at least one outer box containing right and left motors, a control box for controlling said right and left motors, and a battery for supplying electricity to said motors, said outer box being provided at a front portion of said bottom support posts;

a pair of electric drive front wheels, each directly connected to said motors, one to the right motor and the other to the left motor; and a pair of rear wheels attached to said bottom support posts.

2. The electric wheelchair as claimed in claim 1, wherein a single back support post is horizontally provided connecting each free end of said elbow support posts, and further comprising a removable back-rest portion supported by said back support post.

3. The electric wheelchair as claimed in claim 1, wherein two back support posts are provided, each of said back support post vertically raised upward from each free end of said elbow support posts.

4. The electric wheelchair as claimed in claim 3, further comprising a back-rest portion which can be opened backward and is in the form of a door selected from the group consisting of double-leafed hinged door and single swing door.

5. The electric wheelchair as claimed in claim 1, wherein the lower portion and the upper portion of said detachable seat form vacant spaces which are open in the backward direction of said wheelchair.

6. The electric wheelchair as claimed in claim 1, further comprising a plurality of belts for suspending said detachable seat from said elbow support posts.

7. The electric wheelchair as claimed in claim 6, wherein each of said belts is fitted to the seat and detached therefrom by means of a connecting part of the seat side and a connecting part of the belt side.

8. The electric wheelchair as claimed in claim 1, wherein said car body support posts have a diameter in the range of about 25 to 30 mm.

9. An electric wheelchair comprising:

a pair of car body support posts, each car body support post comprising an elbow support post, a front support post and a bottom support post, said car body support posts being formed substantially in a U-shape with an open part of said U-shape directed backward, and with said elbow support post and said bottom support post arranged in parallel with one another;

a bottom plate for firmly connecting said car body support posts side-by-side;

a back support post which can be connected to said elbow support posts at the free end thereof and can be removed therefrom;

a detachable seat removably supported by said car body support posts;

an electric driving unit comprising at least one outer box containing right and left motors, a control box for controlling said right and left motors, and a battery for supplying electricity to said motors, said outer box being provided at a front portion of said bottom support posts;

a pair of electric drive front wheels, each directly connected to said motors, one to the right motor and the other to the left motor;

a pair of rear wheels attached to said bottom support posts; and a seat mount-dismount apparatus comprising a pair of rotation members, each rotation member attached to said elbow support post, one to the right elbow support post and the other to the left elbow support post and rotatable therearound, and handles for rotating said rotation members.

10. The electric wheelchair as claimed in claim 9, further comprising a pair of seat support posts each provided almost at the center between said elbow support post and said bottom support post in parallel therewith.

11. The electric wheelchair as claimed in claim 10, further comprising a ring-shaped running member under each of said rotation members, said rotation members attached to said seat support posts via said running members.

12. The electric wheelchair as claimed in claim 9, wherein said rotation members are covers made of a rigid plate with a deep groove shape deeply fitted to said elbow support posts.

13. The electric wheelchair as claimed in claim 9, wherein said mount-dismount apparatus comprises a plurality of belts for suspending said detachable seat.

* * * * *